United States Patent [19]

Daniel

[11] 4,095,357
[45] Jun. 20, 1978

[54] TREE DIGGER

[75] Inventor: Wendell E. Daniel, Topeka, Kans.

[73] Assignee: International Harvester Company, Chicago, Ill.

[21] Appl. No.: 791,670

[22] Filed: Apr. 28, 1977

Related U.S. Application Data

[63] Continuation of Ser. No. 652,006, Jan. 26, 1976, abandoned, which is a continuation of Ser. No. 313,215, Dec. 8, 1975, abandoned, which is a continuation of Ser. No. 94,890, Dec. 3, 1970, abandoned.

[51] Int. Cl.² .................. A01B 13/00; A01G 23/00
[52] U.S. Cl. ...................................... 37/2 R; 171/110
[58] Field of Search .................. 37/2 R, 192; 171/83, 171/110, 117–119, 120, 127, 141; 172/668, 698; 10/6.48

[56] References Cited

U.S. PATENT DOCUMENTS

| 998,296 | 7/1911 | Lewis | 171/117 |
|---|---|---|---|
| 2,105,532 | 1/1938 | Halousek | 171/110 X |
| 2,446,242 | 8/1948 | Orshansky | 180/6.48 |
| 2,678,105 | 5/1954 | Peterson | 180/6.48 |
| 2,955,845 | 10/1960 | Carroll et al. | 180/6.48 X |
| 3,015,175 | 1/1962 | Smith | 37/192 |
| 3,022,836 | 2/1962 | Bechman | 172/698 |
| 3,032,123 | 5/1962 | Brown | 37/2 R X |
| 3,594,931 | 7/1971 | Yost | 37/2 R |
| 3,717,213 | 2/1973 | Roe et al. | 180/6.48 |

Primary Examiner—Ronald E. Suter
Attorney, Agent, or Firm—Ronald C. Kamp; F. David AuBuchon

[57] ABSTRACT

A plant digging and cleaning machine having a superstructure carried by ground laying tracks on either side thereof, an engine and two hydrostatic transmissions provided for each ground laying track carried above such tracks and permitting a space therebetween for the passage of plants and cleaning apparatus within said space, and an operator's platform above said space on said frame having hand and foot operated controls for controlling the speed and direction of the vehicle as well as controlling the digging and cleaning apparatus.

1 Claim, 4 Drawing Figures

TREE DIGGER

This is a continuation of Ser. No. 652,006, filed Jan. 26, 1976, now abandoned which application was a continuation of Ser. No. 313,215, filed Dec. 8, 1975, now abandoned, and which later application was a continuation of Ser. No. 94,890 filed Dec. 3, 1970, now abandoned.

BACKGROUND OF THE INVENTION

This invention relates to machines having a capability for removing plants from soil and simultaneously removing dirt and other foreign materials from the roots thereof. Such machines have their primary utility in nursery operations in which large numbers of high standing trees and bushes must be removed from the soil, the dirt removed from the root systems, and then balled with a peat moss and dirt mixture for shipping. Inasmuch as such trees and plants are planted in relatively narrow rows, any machine operating for this purpose must have rather exact control features whereby the operator may carefully maneuver so as to avoid bruising any of the trees in the adjoining rows, as such bruising may destroy the marketability thereof. Simultaneously, such a machine must have a capability of rapidly digging and cleaning such trees or plants so as to materially reduce the time and labor required in effectuating a shipment of the plants from a nursery to a distant market. Accordingly, it is an object of the instant invention to provide a machine having capabilities of digging and cleaning and which proffer to the operator thereof an ability to maneuver the machine with utmost precision. Similarly it is an object of the instant invention to provide such a machine having an operator's station thereon which provides a maximum observation of the plants which are to be dug, complete control levers whereby the speed and direction of the vehicle may be incrementally changed, the operation of the cleaning and digging apparatus being controlled by pedal means within easy reach of the operator. Thus a machine is proffered in which an operator may utilize his feet and hands to control precisely all of the major necessary operations without danger of bruising trees, improperly digging or injuring same, with a maximum rate of digging and cleaning and with sufficient power to accomplish same.

DESCRIPTION OF THE DRAWINGS

The manner in which the objects of the invention are attained will be made clear by a consideration of the following specification and claims when taken in conjunction with the accompanying drawings in which:

DETAILED DESCRIPTION

Figures 1, 2:
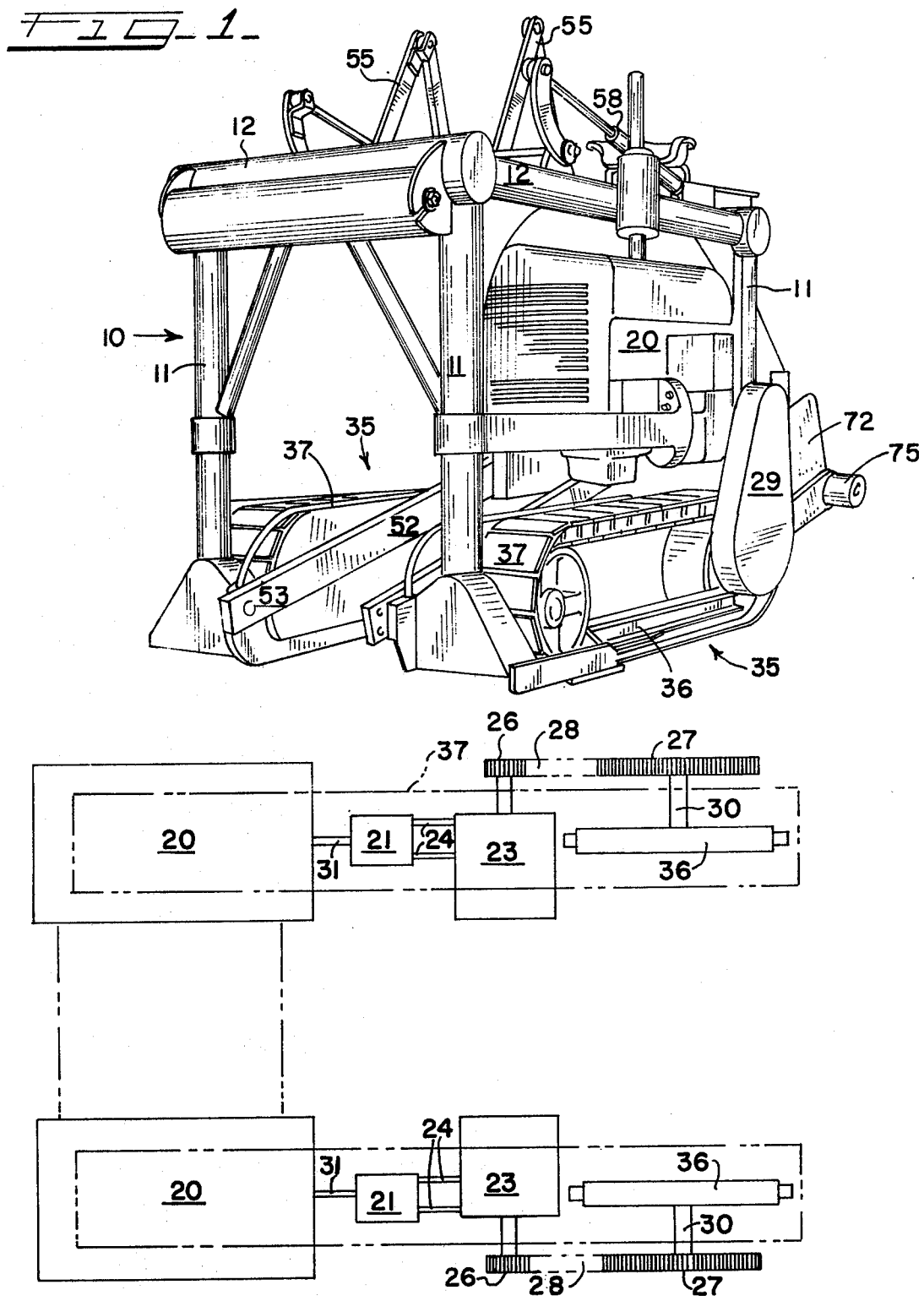
FIG. 1 is a perspective view of the instant invention.
FIG. 2 is a schematic view of the power plant of the instant invention.
Figure 3:
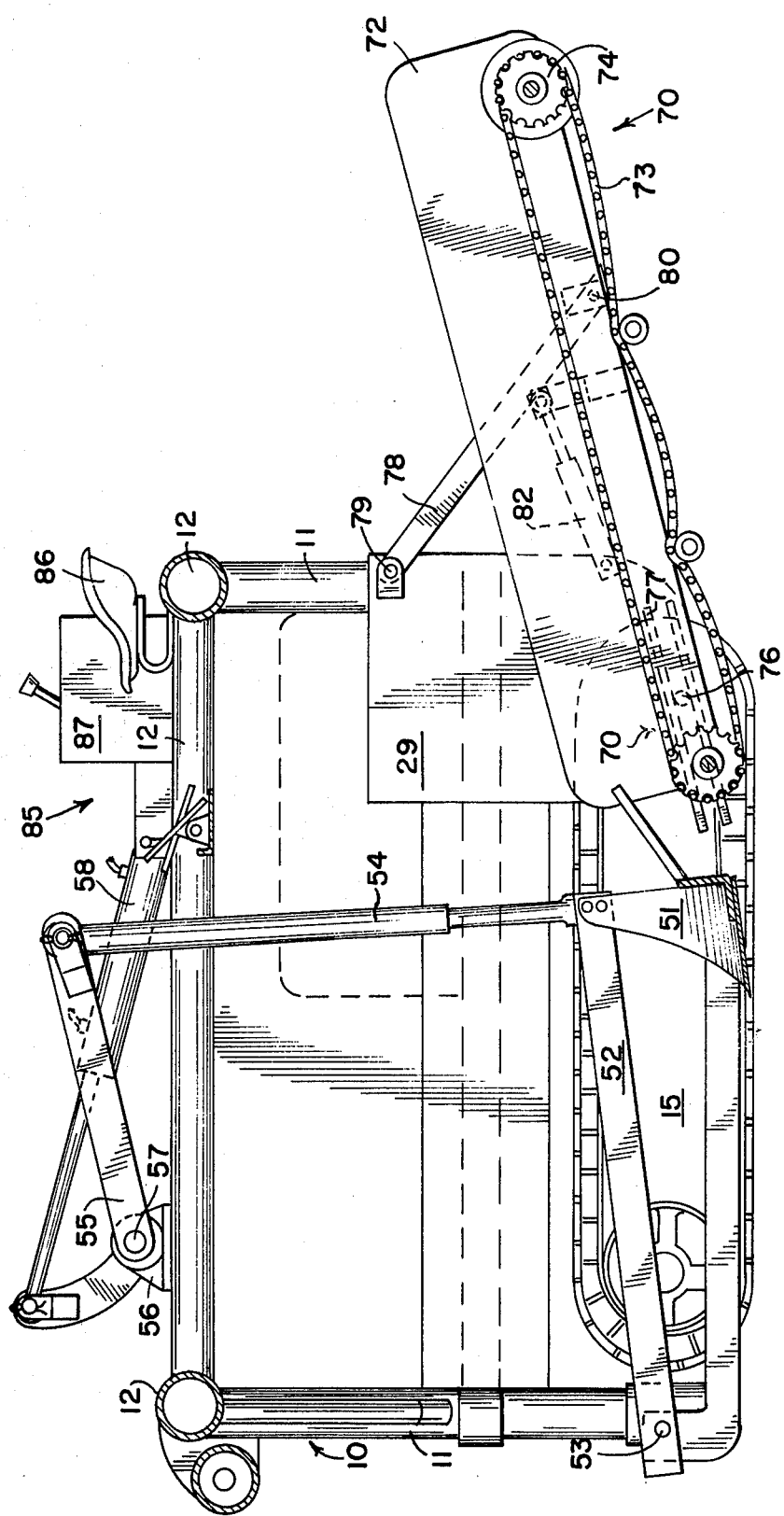
FIG. 3 is a side elevational view of the machine taken along the longitudinal center line thereof.

Referring now to the preferred embodiment disclosed in FIGS. 1 through 4, it will be observed that two laterally disposed track assemblies 35 and 35, provided with tracks 37, 37 and frames 36, 36 support a box-like frame structure 10. This superstructure 10 comprises four vertical supports 11 connected below to the track frames 36 and are integrally connected together at the top by longitudinal and horizontal connecting members 12. Below each of the longitudinal connecting members 12 is supported a power plant in the form of an engine 20, a hydraulic transmission comprising pumps 21, 21 connected to hydraulic motors 23, 23 through delivery and return conduits 24. Drive sprockets 26 connected to the output shaft of such motors in turn drive a driven sprocket 27 through drive chains 28, the drives of sprockets being constrained for rotation with the track sprockets 36 through a shaft 30 whereby power is delivered to the tracks 37. Cover plate 29 may enclose this chain drive. It will be observed that these power plants are laterally spaced apart, and substantially directly below the longitudinal connecting members 12 whereby growing plants may pass between the track assemblies 35 and the two power plants. The forward and rear portions of the power plants may be connected in any conventional way to these upstanding posts 11, or they may alternatively be rigidly suspended from the longitudinal connecting members 12.

Within the lateral space provided by the separation of the two power plants, is provided a digging implement 51 having preferably a curved U-shaped blade, and is supported against excessive longitudinal movement by pivotal braces 52 connected at their forward ends to the vertical post 11, and at their rearward ends to the uppermost portion of the blade 51 on each side thereof. Vertical movement for the blade is provided through lift arms 54 adjacent each of the power plants which are attached at their upper ends to a bellcrank member 55 which in turn is rotatably supported at 57 on upstanding supports 56, 56 which are carried by the longitudinal supports 12. The forward portion of the bellcranks 55 are each connected to a hydraulic motor 58 which has its rearward end pivotally connected to any fixed point on a superstructure 10. Thus, expansion and contraction of the motors 58 will cause the digging blade 51 to raise and lower, lowering thereof causing the blade to enter the ground normally below the roots of the plant, with the forward portion of said blade creating a cutting action through the soil, and the exposed face of said blade causing vertical movement of the plants in the soil whereby such are moved upwardly and onto the cleaning platform or conveyor 70. Preferably, the blade 51 is disposed centrally of the longitudinal axis of the tracks 35 as well as between them. Such a location will permit steering of the vehicle without a lateral movement of the blade. For example, such location will permit a 180° turn of the vehicle without movement of the center of the blade cutting edge, and is most beneficial in digging on curved rows.

The conveyor platform comprises two vertical members 72, 72 (only one of which is depicted) laterally disposed and which support a chain member 73 therebetween, with a sprocket member 74 accepting rotary motion from a hydraulic motor 75 to drive same. The motor 75 may receive fluid energy from a fixed displacement pump driven by one of the engines. The conveyor is attached to the vehicle by pins 76 mounted on each of the side members which is free to reciprocate within channels 77 carried by preferably the superstructure 10. At the rearward end of each conveyor side member 72 is a support arm 78 pivotally connected to the vertical post 11 at their upper ends and to the side members 72 at their lower ends, the connecting points being identified by numerals 79 and 80. Controlling the position of the conveyor 70 with respect to the digging blade 51, is a hydraulic motor 82 which is interconnected between one of the frame members 11 and a member 72. Thus expansion and retraction of the hydraulic motors 82 will cause the conveyor assembly 70 to reciprocate within the channel members 77, such permitting downward sloping movement of the conveyor whereby its forward portion may closely follow the digging blade 51. Additionally conventional shaker mechanisms may be associated with the chain conveyor whereby vibratory action may be transmitted to the plants so as to free the soil and foreign materials therefrom.

Thus it should be apparent that as the digging implement 51 is lowered into a cutting position, the conveyor assembly 70 may also follow this implement 51 so as to receive the cut plants therefrom and to convey and vibrate same rearwardly whereby the trees will exit rearwardly of the vehicle with their roots clean and ready for balling with peat moss and dirt.

Figure 4:
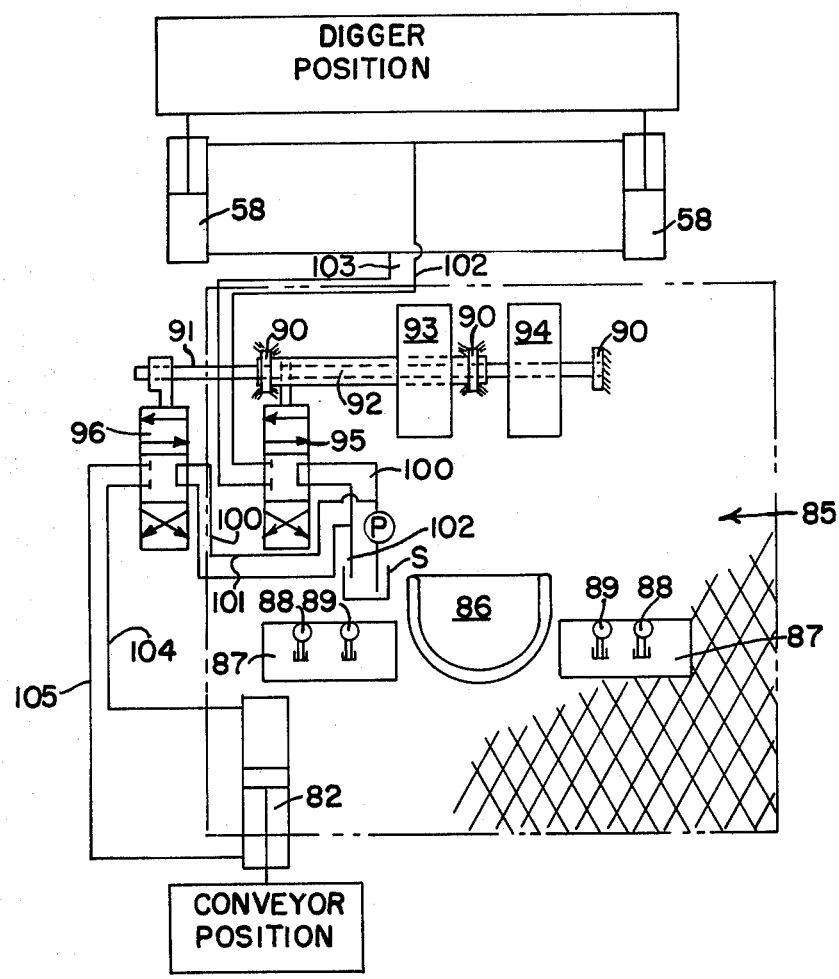
FIG. 4 is a schematic view of the hydraulic control circuit, the operator's station, and the power plant controls.

Considering now primarily FIG. 4, the operator's station 85 is disposed above the connecting members 12 whereby the operator's seat 86 is positioned so as to permit visual observation by the operator of the plants to be dug, the digging implement 51 as well as the forward portion of the conveyor assembly 70. Preferably a floor of wire mesh is provided which extends between the two longitudinal connecting members 12 so as to provide a floor and support platform. To the right and left of the operator's seat 86 is provided a pedestal mount 87 which houses manually operated control handles. Control levers 88, 88 through various linkages extends down to each engine so as to control the RPM thereof. Control handles 89 would be interconnected with linkages either directly to or through several control mechanisms to the swash plates of the hydrostatic pumps and motors. Consequently it will be appreciated that if a fixed displacement type hydraulic motor is utilized to operate the conveyor assembly 70, and is associated with an internally mounted fixed displacement pump, the speed of the engines may be controlled by levers 88 so as to provide hydraulic fluid to drive the conveyor assembly at any desired speed. However, machine speed control is provided through the swash plate control handles 89 whereby the swash plates of the pumps and motors may be infinitely varied to provide incremental control of forward reverse and directional speeds of the track assemblies 35.

Directly forward of the operator's seat 86 are two foot pedals 93 and 94 utilized to control the position of the conveyor 70 and blade 51. A right support member 90 pivotally journals an internal rod 91, while an external tubular member 92 is pivotally journaled within the left two supports 90, all of the supports being rigidly attached to the floor of the operator's station 85. Each pedal 93 and 94 is appropriately constrained for rotation with either the external or internal control rods 92 or 91 and foot operated rotational movement of such pedals will cause a corresponding rod to rotate. On the left end of each of these control rods is a lever depending downwardly so as to be pivotally interconnected with the spool of a three position four-way conventional directional flow control valve the actuation of which are controlled by the foot pedals.

A pump P driven by one of the engines draws fluid from a sump S to deliver fluid energy through conduits 100 and 101 to the directional flow control valves 95 and 96. If the spool remains in its neutral position as depicted in FIG. 4, an open center passage within the spool valves will return such fluid energy through a conduit 102 to the sump. Alternatively if the foot pedals are urged forwardly, each spool of the valves 95 and 96 will be reciprocated rearwardly whereby fluid energy will be directed to the rod end of hydraulic motors 58, 58 through a conduit 102, as well as the rod end of motor 82 which controls the conveyor positions through a conduit 105, and such foot pedal actuation will cause the blade to enter the ground and conveyor 70 to follow. Thus, it should be appreciated that the operator of the instant invention may simultaneously control the position of the digging implement 51 and the conveyor assembly 70 with the operation of foot pedals 93 and 94.

MODE OF OPERATION

The operator of the vehicle after starting the engines may first establish the rate at which the conveyor moves by setting a given RPM on the engine with which a fixed displacement pump is associated and to which a hydraulic motor 75 for the conveyor is hydraulically connected. Further, any desirable RPM may be set upon both of the engines without substantially effecting the rate of travel of the machine, such engine RPM primarily being adapted to deliver the necessary horsepower to the vehicle so as to propel the digging implement 51 through the soil. After such RPM is set upon each of the engines with the throttles 88, 88, the operator may move the vehicle forward by urging the swash plate control handles 89 forwardly in a well known and conventional manner. Similarly to effect reverse of the vehicle both control handles 89 should be moved rearwardly whereby the swash plates of the pump and motor will appropriately respond to provide reverse drive of the track assemblies 35. Steering action may be accomplished by moving either control handle forwardly or reverse, or by moving the control handles in an opposite direction depending upon the radius of turn which is desirable. As the operator maneuvers the vehicle over the rows of plants which are to be dug, he may maintain visual observation of them from the operator's station 85, and as the digging implement approaches the plants to be dug, the operator through operation of the foot pedals 93 and 94 may force the digger into the ground, and simultaneously move the conveyor rearwardly or forwardly so as to place same in the best position for picking up the trees and soil from the digging blade 51. Consequently, it should be observed that separate controls are provided for each function of the machine, and each of these may be controlled through an appropriate appendage of the operator. Thus simultaneous control of speed direction of the digging implement 51 and the conveyor assembly 72 is accomplished from a position providing maximum observation.

I claim:

1. A plant digging machine having forward and rearward ends comprising:
 a frame including an elevated portion and downward extending supports;
 a pair of laterally spaced track assemblies connected to said supports;
 a pair of engines, each engine affixed to said frame and positioned above one of said pair of track assemblies;
 an independent, variable speed drive train extending between each engine and its underlying track assembly;

each drive train including:
  hydrostatic transmission having a variable volume pump driven by the engine and a hydraulic motor driven by the pump;
  a drive sprocket driven by the motor;
  a driven sprocket drivingly connected to one of said track assemblies; and
  a driven chain extending between and drivingly connecting said drive and driven sprockets;
said supports, said engines, said driven trains and said track assemblies defining an open space therebetween to permit the plants to be straddled thereby as the machine is driven forward;
bell crank means rotatably supported on said elevated portion of the frame;
  a pair of lift arms pivotally connected to said bell crank means and extending downward on each side of said open space;
  a blade connected to the lift arms and positioned between said track assemblies and centrally of their length;
brace means extending between said blade and frame;
hydraulic ram means connected to said bell crank means for vertically adjusting said blade; and
an operator's station including a seat located on said frame above said elevated portion and toward the rear of the machine to permit ready observation of said blade and plants to be dug thereby within said open space.

* * * * *